(12) United States Patent
Chen et al.

(10) Patent No.: US 8,359,191 B2
(45) Date of Patent: Jan. 22, 2013

(54) DERIVING ONTOLOGY BASED ON LINGUISTICS AND COMMUNITY TAG CLOUDS

(75) Inventors: Feng-Wei Chen, Cary, NC (US); David G. George, Cary, NC (US); John A. Medicke, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 12/184,731

(22) Filed: Aug. 1, 2008

(65) Prior Publication Data

US 2010/0030552 A1    Feb. 4, 2010

(51) Int. Cl.
*G06F 17/27* (2006.01)

(52) U.S. Cl. .......... 704/9; 704/1; 704/4; 704/7; 704/10; 704/270; 707/734

(58) Field of Classification Search .......... 704/270, 704/245, 1–10
See application file for complete search history.

(56) References Cited

U.S. PATENT DOCUMENTS

| | | | | |
|---|---|---|---|---|
| 5,694,523 A * | 12/1997 | Wical | | 706/45 |
| 6,199,034 B1 * | 3/2001 | Wical | | 704/9 |
| 6,415,283 B1 * | 7/2002 | Conklin | | 1/1 |
| 6,763,341 B2 * | 7/2004 | Okude | | 706/45 |
| 6,801,229 B1 * | 10/2004 | Tinkler | | 715/853 |
| 7,269,544 B2 * | 9/2007 | Simske | | 704/4 |
| 7,441,038 B2 * | 10/2008 | Arellano et al. | | 709/230 |
| 7,505,989 B2 * | 3/2009 | Gardner et al. | | 1/1 |
| 7,526,425 B2 * | 4/2009 | Marchisio et al. | | 704/9 |
| 7,580,918 B2 * | 8/2009 | Chang et al. | | 1/1 |
| 7,761,478 B2 * | 7/2010 | Akkiraju et al. | | 707/794 |
| 8,027,948 B2 * | 9/2011 | Akkiraju et al. | | 706/55 |
| 8,037,066 B2 * | 10/2011 | Majko | | 707/734 |
| 8,082,248 B2 * | 12/2011 | Abouyounes | | 707/731 |
| 8,086,557 B2 * | 12/2011 | Ait-Mokhtar et al. | | 706/62 |
| 2004/0190774 A1 * | 9/2004 | Baker | | 382/187 |
| 2005/0171760 A1 * | 8/2005 | Tinkler | | 704/10 |
| 2005/0278164 A1 * | 12/2005 | Hudson et al. | | 704/4 |
| 2007/0005343 A1 * | 1/2007 | Sandor et al. | | 704/9 |
| 2007/0078889 A1 * | 4/2007 | Hoskinson | | 707/102 |
| 2008/0059897 A1 * | 3/2008 | Dilorenzo | | 715/764 |
| 2008/0114573 A1 * | 5/2008 | Hsieh et al. | | 703/2 |

(Continued)

OTHER PUBLICATIONS

Spärck Jones, Karen (1972). "A statistical interpretation of term specificity and its application in retrieval". Journal of Documentation 28 (1): 11-21.*

(Continued)

*Primary Examiner* — Pierre-Louis Desir
*Assistant Examiner* — Fariba Sirjani
(74) *Attorney, Agent, or Firm* — DeLizio Gilliam, PLLC

(57) ABSTRACT

In some embodiments, a method comprises receiving a tag cloud including tags that hyperlink to web content. The method can also comprise separating the tags into different linguistic categories, assigning a weight to each tag, and grouping the tags into clusters, wherein tags in a cluster are associated with a context. The method can also include determining one or more domains for the tag clusters, wherein a domain is a broadest class that defines one or more of the tags in a linguistic category, determining a hierarchy for the tags based on the weights of the tags, and identifying linguistic relationships between the tags. The method can also comprise determining properties associated with one or more of the tags and one or more of the domains, wherein the tag's properties are determined using linguistic analysis and storing the tags, the hierarchies, the linguistic relationships, and the properties.

25 Claims, 15 Drawing Sheets

AMIE    BEAUTIFUL
AMIGOS    CACHORRO    BABYDOG
      BEACH  ANIMAL  DOG  CUTE
FAMILY  DRIVE
       PERRO    FRIENDLY    LOVEMYDOG
DOGS    MASCOT    FRIENDS  PUPPIES
SMALLDOG        OCEAN                KEYWEST
    TERRIER    PARTY   PUPPY  WALK  PETS
    SWIM    VANCOUVER   YORKIETERRIER   YORKIE
    YORKSHIRE    YORKSHIRETERRIER    YORKY

U.S. PATENT DOCUMENTS

| | | | |
|---|---|---|---|
| 2008/0114644 A1* | 5/2008 | Frank et al. | 705/14 |
| 2008/0209339 A1* | 8/2008 | Macadaan et al. | 715/745 |
| 2008/0270120 A1* | 10/2008 | Pestian et al. | 704/9 |
| 2009/0012842 A1* | 1/2009 | Srinivasan et al. | 705/10 |
| 2009/0094189 A1* | 4/2009 | Stephens | 707/2 |
| 2009/0204386 A1* | 8/2009 | Seligman et al. | 704/2 |
| 2009/0204596 A1* | 8/2009 | Brun et al. | 707/5 |
| 2009/0271179 A1* | 10/2009 | Marchisio et al. | 704/9 |
| 2009/0287674 A1* | 11/2009 | Bouillet et al. | 707/5 |
| 2009/0327120 A1* | 12/2009 | Eze et al. | 705/38 |
| 2010/0082331 A1* | 4/2010 | Brun et al. | 704/9 |
| 2010/0114879 A1* | 5/2010 | Zhong et al. | 707/723 |
| 2010/0228693 A1* | 9/2010 | Dawson et al. | 706/12 |
| 2010/0332475 A1* | 12/2010 | Birdwell et al. | 707/737 |
| 2011/0213655 A1* | 9/2011 | Henkin et al. | 705/14.49 |
| 2011/0225155 A1* | 9/2011 | Roulland et al. | 707/737 |
| 2012/0005195 A1* | 1/2012 | Cain et al. | 707/722 |

OTHER PUBLICATIONS

Paolo Besana, et al., "Contexts in Dynamic Ontology Mapping", Centre for Intelligent System and their Applications School of Informatics, University of Edinburgh, 2005, American As.*

Guo, Hui et al.; "Learning Ontologies to Improve the Quality of Automatic Web Service Matching"; Jul. 2007; IEEE International Conference on Web Services, 2007; pp. 1-8.*

Nakov, P. and Hearst, M., Using Verbs to Characterize Noun-Noun Relations, in the Proceedings of AIMSA 2006, Bulgaria, Sep. 2006.*

Knautz, K., Soubusta, S., & Stock, W.G. (2010). Tag clusters as information retrieval interfaces. Proceedings of the 43rd Annual Hawaii International Conference on System Sciences (HICSS-43), Jan. 5-8, 2010. IEEE Computer Society Press (10 pages).*

Hassan-Montero, Yusef and Herrero-Solana, Victor, "Improving Tag-Clouds as Visual Information Retrieval Interfaces" I International Conference on Multidisciplinary Information Sciences and Technologies, InSciT2006. Mérida, Spain. Oct. 25-28, 2006.*

L. Zhang, X. Wu, and Y. Yu, "Emergent Semantics from Folksonomies: A quantitative study," Journal on Data Semantics VI (Lecture Notes in Computer Science), 2006, pp. 168-186.*

Gruber, Thomas. "Ontology of Folksonomy: A Mash-Up of Apples and Oranges." International Journal on Semantic Web and Information Systems, 3.1 (2007): 1-11.*

Peter Mika. "Ontologies are us: A unified model of social networks and semantics." Journal of Web Semantics 5 (1), p. 5-15, 2007.*

Scott Golder and Bernardo A. Huberman, "The structure of collaborative tagging systems." Journal of Information Sciences, 32(2): 198-208, Apr. 2006.*

HL Kim, S Scerri, JG Breslin, S Decker, HG Kim, "The state of the art in tag ontologies: a semantic model for tagging and folksonomies" Proceedings of the 2008 International Conference on Dublin Core and Metadata.*

HL Kim, A Passant, JG Breslin, S Scerri, S Decker, "Review and alignment of tag ontologies for semantically-linked data in collaborative tagging spaces," Semantic Computing, 2008 IEEE International Conference on, 315-322.*

Sinclair, J., and Cardew-Hall, M. The folksonomy tag cloud: when is it useful? Journal of Information Science. 6 (1), 15-23. Feb. 1, 2008.*

Golder S, Huberman BA, Usage patterns of collaborative tagging systems. Journal of Information Science 2006; 32(2): 198-208.*

\* cited by examiner

AMIE  CACHORRO  BEAUTIFUL
AMIGOS           BABYDOG
         BEACH  ANIMAL  DOG  CUTE
FAMILY  DRIVE
                   FRIENDLY   LOVEMYDOG
         PERRO
DOGS                FRIENDS  PUPPIES
         MASCOT                           KEYWEST
SMALLDOG      OCEAN
    TERRIER       PARTY  PUPPY  WALK  PETS
  SWIM   VANCOUVER   YORKIETERRIER  YORKIE
YORKSHIRE  YORKSHIRETERRIER   YORKY

FIG. 1

|  | TEXT | TAG | TITLE (IMPLIED TAG) | (TAG + IMPLIED TAG IN TITLE) / TEXT |
|---|---|---|---|---|
| YORKSHIRE TERRIER | 15 | 5 | 9 | 0.93 |
| TERRIER | 167 | 81 | 34 | 0.68 |
| DOG | 2800 | 1500 | 1 | 0.53 |
| PET | 800 | 350 | 1 | 0.43 |
| ANIMAL | 1900 | 760 | 0 | 0.35 |

| SUBJECT | OBJECT | VERB | VERB (STATISTIC NUMBER) IN TEXT |
|---|---|---|---|
| ANIMAL -> DOGS -> TERRIER -> YORKSHIRE | PLACE -> BEACH | WALK | 10 % |
| ANIMAL -> DOGS -> TERRIER -> YORKSHIRE | PLACE -> BEACH | SWIM | 1.5 % |
| ANIMAL -> DOGS -> TERRIER -> YORKSHIRE | PLACE -> BEACH | DRIVE | 1 % |

DERIVING ONTOLOGY BASED ON LINGUISTICS AND COMMUNITY TAG CLOUDS

TECHNICAL FIELD

Embodiments of the inventive subject matter generally relate to the field of web environments, and more particularly to deriving ontology based on linguistics and community tag clouds.

BACKGROUND

The semantic web is an extension of the World Wide Web where the relationship (or semantics) between web information is well defined. The semantic web provides a method enabling machines to understand information in the same way that humans do, thus allowing machines to perform tasks such as finding and analyzing relevant data. The operation of the semantic web depends on the availability of an exhaustive description and classification (ontology) of various real worlds entities (e.g., people, places, objects, etc) and the relations between them.

SUMMARY

In some embodiments, a method comprises receiving a tag cloud including tags that hyperlink to web content. The method can also comprise separating the tags into different linguistic categories, assigning a weight to each tag, and grouping the tags into clusters, wherein tags in a cluster are associated with a context. The method can also include determining one or more domains for the tag clusters, wherein a domain is a broadest class that defines one or more of the tags in a linguistic category, determining a hierarchy for the tags based on the weights of the tags, and identifying linguistic relationships between the tags. The method can also comprise determining properties associated with one or more of the tags and one or more of the domains, wherein the tag's properties are determined using linguistic analysis and storing the tags, the hierarchies, the linguistic relationships, and the properties.

BRIEF DESCRIPTION OF THE DRAWINGS

The present embodiments may be better understood, and numerous objects, features, and advantages made apparent to those skilled in the art by referencing the accompanying drawings.

FIG. 1 shows an example tag cloud as displayed on a website.

DESCRIPTION OF EMBODIMENT(S)

Figure 2:
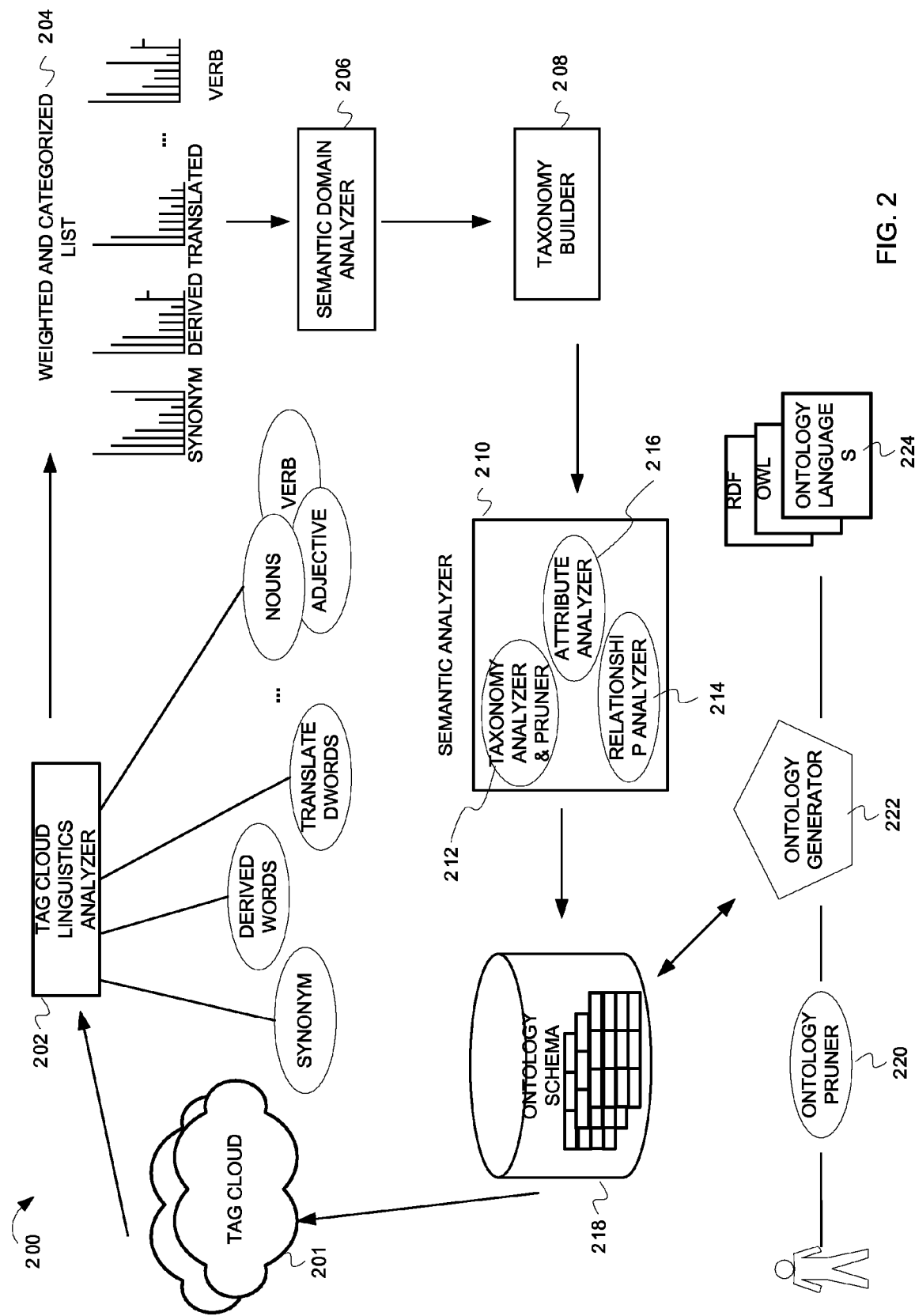
FIG. 2 is a conceptual block diagram illustrating the architecture and functionality of a system configured to transform a tag cloud into a structured ontology according to some embodiments of the invention.

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Introduction

Websites typically use tags and tag clouds to describe and locate web content. In describing content, users can browse through a website and "tag" content that appeals to them (e.g., web pages, pictures, video, etc). In some instances, users upload and tag their own content, so others can find it. To facilitate tagging, websites may provide users with a graphical user interface (GUI) through which they can apply tags to content. In some instances, users can apply multiple tags to the same content and post reviews of the content. Websites also use tag clouds to help users locate content. Tag clouds typically contain a set of related tags, where the tags can be text, such as keywords, that describe web content. Websites may present a tag cloud to help users find desired content, such as in response to a keyword search or other user inputs. FIG. 1 shows an example tag cloud that may be displayed by a website.

Although tagging can help users find content, there are some disadvantages associated with tagging. For example, tags are generally single words, as most tagging technologies do not allow multiple word (phrase) tags. Also, users cannot associate a context or description with the tags. For example, a user may tag a picture as "dog". Alone, this tag (dog) could have a variety of meanings (e.g., animal, food, person, etc.). Adding context to the tag (e.g., John's dog plays in the garden) could give users a better understanding of what to expect when they click on the tag. Additionally, different users can use the same tag with different meanings, thus making tags semantically imprecise. For example, a user interested in computers may search for content tagged "Apple" only to receive results related to the fruit. Current tagging technology also does not allow tags to be associated with their synonyms. For example, pictures tagged as "dog" will not show up when a user searches for content associated with the tag "puppy". Therefore, as the tag space grows, the value of tags may diminish.

The Semantic web provides an efficient method to represent information by defining relationships (or semantics) between web information. The Semantic web provides a method enabling machines to understand information in the same way that humans do, thus allowing machines to perform tasks such as finding and analyzing relevant data. The information is stored in an ontology, which is a representation of the relationship between different entities (e.g., words in a language). From a tagging standpoint, ontology is useful because it associates tags with their synonyms, provides context and description for tags, and defines relationships with other tags. For example, a German shepherd can be classified as a type of dog and a type of animal, with attributes (e.g., eye color, fur color, etc.), and relationships (e.g., owned by a human, guards human's house, etc). This method of tag classification provides more contexts, description, and a better understanding than flat single-word tags that have no associated description.

Once this ontology (classification) is generated, it can provide users with a better way to visualize the tag environment and describe how individual tags are related to one another. The ontology can also enable users to add description to their tags, thus making tags more understandable, informative (semantically rich), and easy to locate. Additionally, it also results in more precise and specific searches and captures the users' behavior, usage of words, etc. For example, consider two tags—one that reads "sunset at Pompano beach", the other that reads "sunset at Miami beach". A user may search for content with tags "sunset in Florida". Using the ontology and the semantic web, the machine may identify that Pompano Beach and Miami Beach are both in Florida and hence display both results. However, the process of generating such a classification is very time consuming, requires people with a lot of programming expertise, and a variety of domain experts. Moreover, users tend to use colloquialisms and people's vocabulary changes over time.

Some embodiments of the inventive subject matter describe a method for automatically generating ontology from a tag cloud, thus enabling users to efficiently search, navigate, and tag content. Some embodiments of the inventive subject matter also describe a method for generating a concise ontology from a tag cloud, where the ontology matches current language trends. The discussion below describes the method for ontology generation and other important features in greater detail.

Example Architecture and Operating Environments

FIG. 2 is a conceptual block diagram illustrating the architecture and functionality of a system 200 configured to transform a tag cloud into a structured ontology according to some embodiments of the invention.

As shown in FIG. 2, tag cloud 201 (see FIG. 1 for an example tag cloud) is an input to the tag cloud linguistics analyzer 202. In some instances, the user can specify the website from which the tag cloud is obtained. In other instances, users can specify a server (e.g., server address) from which tag cloud data should be mined. After the tag cloud linguistics analyzer 202 identifies the tag cloud and extracts the tags, it performs a linguistic analysis to separate the tags into categories, such as nouns, verbs, adjectives, synonyms, translated words, etc. For each noun tag in each set, the tag cloud linguistics analyzer 202 calculates how many times the tag word appears in the text and assigns a preliminary weight to each of the tag words. The tag cloud linguistics analyzer sends, as an input to a semantic domain analyzer 206, the weighted list 204, which includes high frequency or important words.

The semantic domain analyzer 206 establishes a domain of the tag words. The domain refers to the largest category or broadest class that defines the other tag words. For example, the tag "Yorkshire" may refer to a dog, a place in the United Kingdom (U.K.), or a pudding. The domain name helps clarify this ambiguity. If the domain is "animal", Yorkshire refers to a dog, whereas if the domain is "place", Yorkshire refers to a county in the U.K. Once the semantic domain analyzer 206 establishes the domain, it sends the weighted tags 204 to a taxonomy builder 208

The taxonomy builder 208 generates a classification tree from the weighted tags. In other words, the taxonomy builder converts tags from a tag cloud into a tree showing how different tags are related to other words. The taxonomy builder 208 generates taxonomy (i.e., the classification tree) for each of the noun tags and later combines the individual trees into a cumulative taxonomy. The cumulative taxonomy forms the input to a semantic analyzer 210.

The semantic analyzer 210 includes a taxonomy analyzer and pruner 212, a relationship analyzer 214, and an attribute analyzer 216. The taxonomy analyzer and pruner 212 appends a weight to each node in the classification tree. The analyzer uses any suitable algorithm to search through the specified website and determine the number of times the keyword (tag word) occurs in text, titles, and as tags, and calculates a tag-to-text ratio that acts as the node weight. The weights help determine classification levels. The lower the weight, the more general the class, the higher the weight, the more specific is the class. The relationship analyzer 214 derives relationships between different domains and between words in different domains. From a tag standpoint, it provides users with a better way to visualize the tag environment and also shows how different tags relate to each other. The attribute analyzer 216 determines attributes or defining properties and characteristics for the domains and classes. Determining the attributes provides the user with a better understanding of the tag and enables more precise and specific searches. Thus, the semantic analyzer 210 determines and characterizes useful information about the tag.

The ontology can include the tag classification, the weights associated with each node in the tree, the relationships between different nodes, and the attributes of the nodes. The ontology is stored in an ontology schema 218. The ontology schema 218 is stored in a repository (e.g., as a database on a storage device).

Thus to summarize, the various components of this system can mine the tag cloud and linguistically classify each of the tags in the tag cloud. The system can also analyze and cluster tags based on similar properties and word usages. Further-more, the system can determine a hierarchy for each of the noun tags and determine a combined hierarchy for all the noun tags. The system can use the verb tags to identify potential relationships between the various tags and domains, while other linguistic analysis techniques are applied on the noun tags to determine their properties. The system can also store noun tags, their hierarchy, their relationships (or actions), and their defining attributes in a repository to enable users to perform efficient searches, navigation and tagging.

The procedure described above can be an iterative process. When a new tag cloud is found, the tag cloud linguistic analyzer 202 extracts and classifies tags based on their linguistic functionality. The semantic domain analyzer 206 clusters related nouns and determines the domain of the noun tags in the tag cloud. The system queries the ontology repository 218 to determine if the domain already exists. If the domain does not exist, a new one is created following the sequence of steps described above and the corresponding information is added to the repository. If the domain exists, information derived from the new tag cloud is added to the repository.

At the user's end, the system prompts the user for preference information. This can include a broad category (e.g., dog) or a narrower category (e.g., Yorkshire terrier) to help the ontology generator 222 identify the domain and generate the appropriate classification tree. The system also prompts the user for a pruning threshold. The ontology pruner 220 and the ontology generator 222 work together to eliminate all the nodes below the pruning threshold. The user interface (e.g., website GUI) may display an initial ontology with weights to help the user better select a threshold, provide a description, and let the user enter weights by trial and error, etc. Additionally, more advanced users may also have the option of selecting an ontology display language 224 (e.g., RDF).

Figure 3:
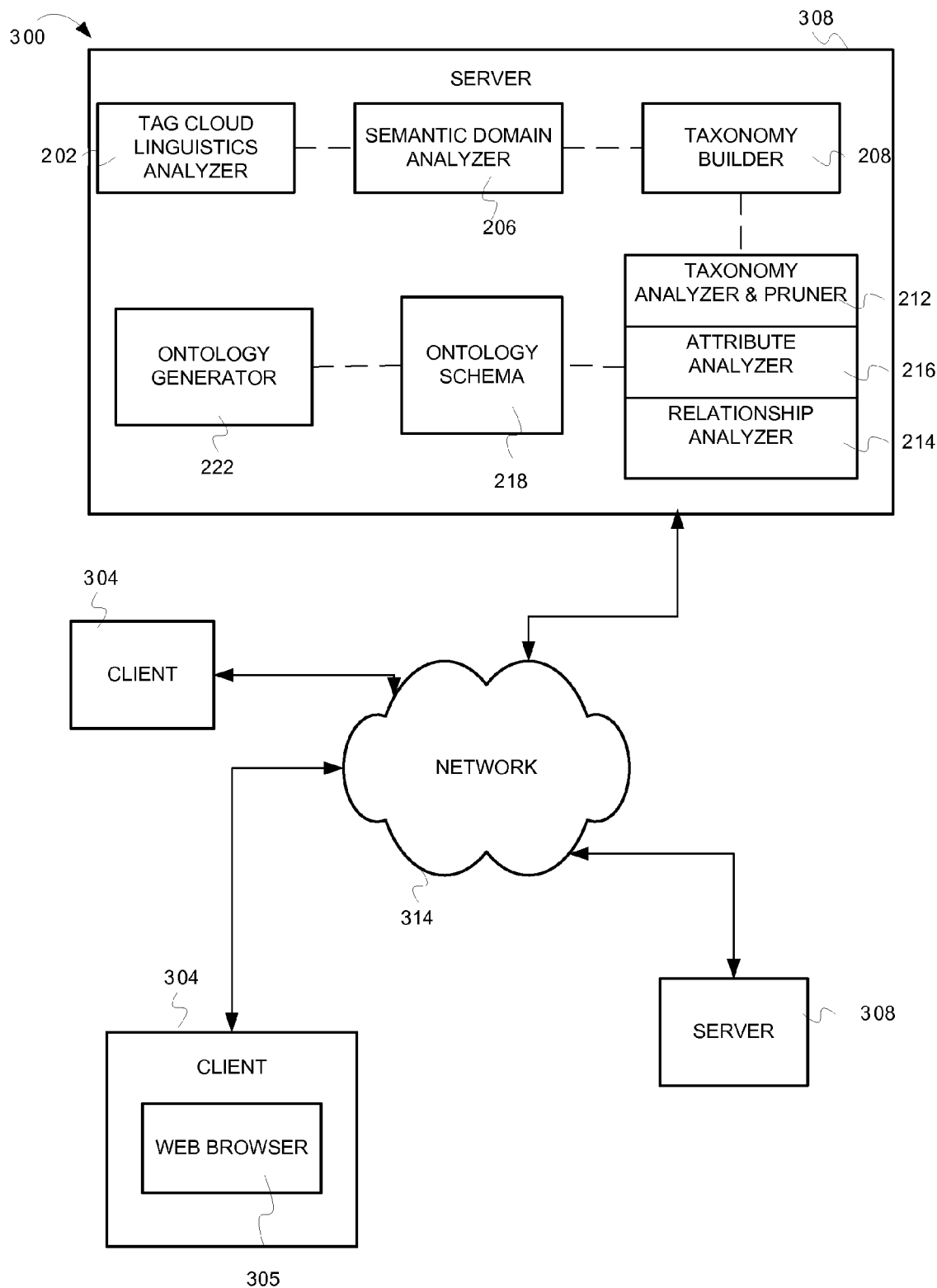
FIG. 3 is an architectural block diagram illustrating a client-server system configured to transform a tag cloud into a structured ontology according to some embodiments of the invention.

Any one or more of the components described in FIG. 2 can reside on a plurality of computers such as the client server architecture shown in FIG. 3. In FIG. 3, the server 308 includes a tag cloud linguistic analyzer 202, a semantic domain analyzer 206, a taxonomy builder 208, a taxonomy analyzer and pruner 212, an attribute analyzer 216, a relationship analyzer 214, ontology schema 218, and an ontology generator 222. The client 304 includes a web browser 305 or other software capable of displaying a tag cloud and tag ontology The servers 308 and the clients 304 are connected to a communication network 314. The communication network 314 can include any technology suitable for passing communication between the clients and servers (e.g., Ethernet, 802.11n, SONET, etc.). Moreover, the communication network 314 can be part of other networks, such as cellular telephone networks, public-switched telephone networks (PSTN), cable television networks, etc. Additionally, the server 308 and clients 304 can be any suitable computing devices capable of executing software in accordance with the embodiments described herein.

The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Example Tag Cloud Linguistic Analyzer Operations

Figure 4A:
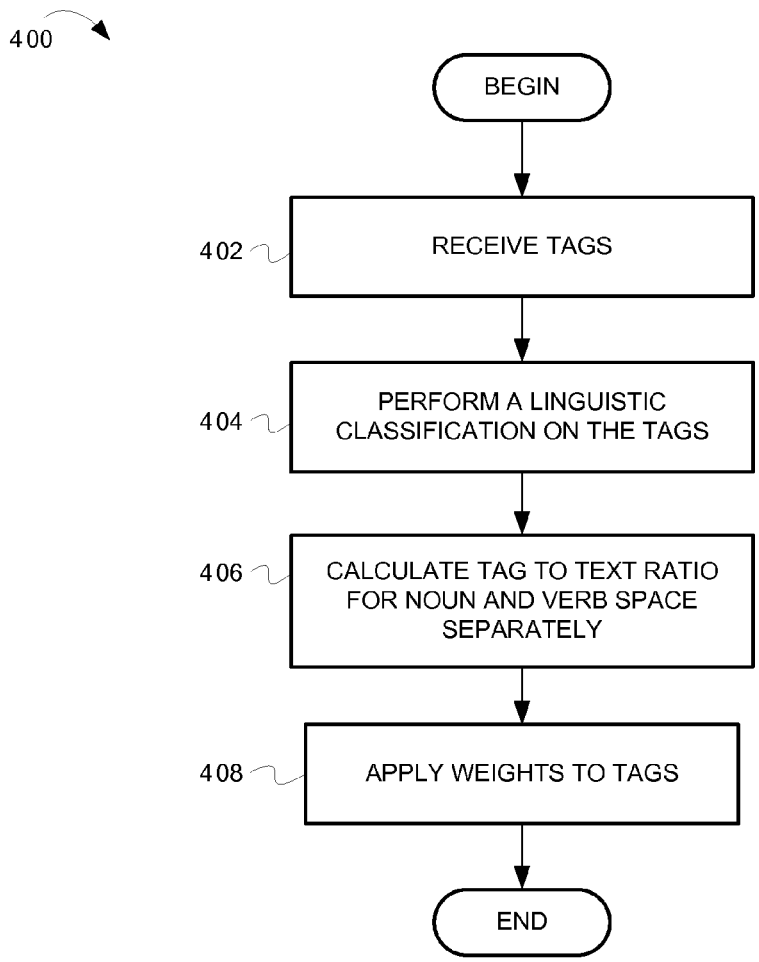
FIG. 4A is a flow diagram illustrating operations for classifying and weighting tags from a tag cloud according to some embodiments of the invention.

FIG. 4A is a flow diagram illustrating operations for classifying and weighting tags from a tag cloud according to some embodiments of the invention. The tag cloud in FIG. 1 is for a 'Yorkshire terrier' and is the input to a tag cloud linguistics analyzer 202. Throughout this specification, we will refer to examples and describe the operation of the components based on the tag cloud of FIG. 1. The following discussion will describe the flow 400 with reference to the architectural diagram of FIG. 2. The flow diagram 400 begins at block 402.

At block 402, the tag cloud linguistics analyzer 202 receives tags from a tag cloud 201. In some instances, the user can specify the tag cloud to be used as an input. In other instances, the user can specify the website or the server (e.g., website URL) from which the tag cloud linguistics analyzer 202 can retrieve the tag cloud. After the tag cloud linguistics analyzer 202 extracts tags from the tag cloud, the flow continues at block 404.

Figure 4B:
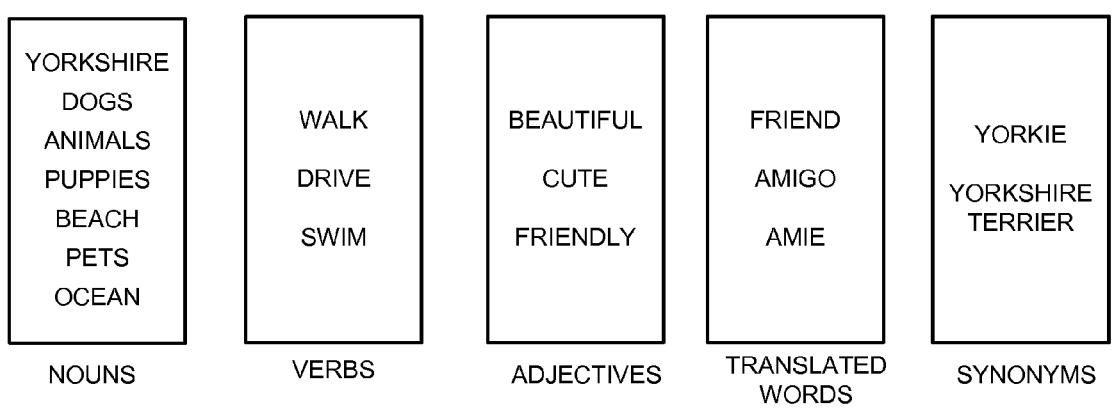
FIG. 4B is illustrates the concept of linguistic classification of tags according to some embodiments of the invention.

At block 404, the tag cloud linguistics analyzer 202 performs a linguistic classification on the tags. The tags are separated into sets (or buckets) of nouns, verbs, adjectives, synonyms, derived words, and translated words. FIG. 4B illustrates the concept of linguistic classification of tags according to some embodiments of the invention. As shown in FIG. 4B, the tags (from FIG. 1) are classified into nouns (e.g., Yorkshire, dogs, animals, etc), verbs (e.g., walk, swim, etc), and adjectives (e.g., beautiful, cute, etc). Synonyms (e.g., Yorkie and Yorkshire terrier) and translated words (friend, amigo, etc) are grouped into different "buckets". Derived words (not shown), which are words with the same root word (e.g., entertain, entertainer, entertainment), are also grouped together. In one embodiment, the tag cloud linguistics analyzer 202 can consult a linguistic dictionary (e.g., an online dictionary, such as Merriam-Webster Online) to make this classification. Referring back to FIG. 4A, once the tag cloud linguistics analyzer categorizes all the tags in the tag cloud, the flow continues at block 406.

At block 406, the tag cloud linguistics analyzer 202 calculates the tag to text ratio for the noun and verb spaces. The tag cloud linguistics analyzer 202 can use any suitable algorithm to parse through all the tags and text associated with the specified website. The tag cloud linguistics analyzer 202 can determine the number of times the tag keyword occurs in the website's text and the number of times the keyword is used as a tag. With these statistics, the tag cloud linguistics analyzer 202 calculates the tag to text ratio (i.e., the ratio of the number of times the keyword is used as a tag to the number of times the keyword appears in the text), uses these values as initial weights, and appends these weights to the tags. The flow continues at block 408.

At block 408, the tag cloud linguistics analyzer 202 applies the weights to the tags in the linguistic buckets creating a weighted tag list 204. The weights indicate the significance and relevance of the keyword when used as a tag. In other words, the higher the weight the more significant (and rare) is the tag word. For example, the tag "animal" is a common word and hence occurs more frequently in text as compared to the tag "Yorkshire terrier". Therefore, "Yorkshire terrier" will have a higher tag to text ratio weight as compared to "animal". This indicates that "Yorkshire terrier" is more significant and provides more meaning and description as compared to "animal". After the tag cloud linguistics analyzer 202 weights the tags, the flow ends.

A semantic domain analyzer 206 can further analyze the weighted tags in the linguistic buckets to determine the tag cloud domains, as described below.

Example Semantic Domain Analyzer Operations

Figure 5A:
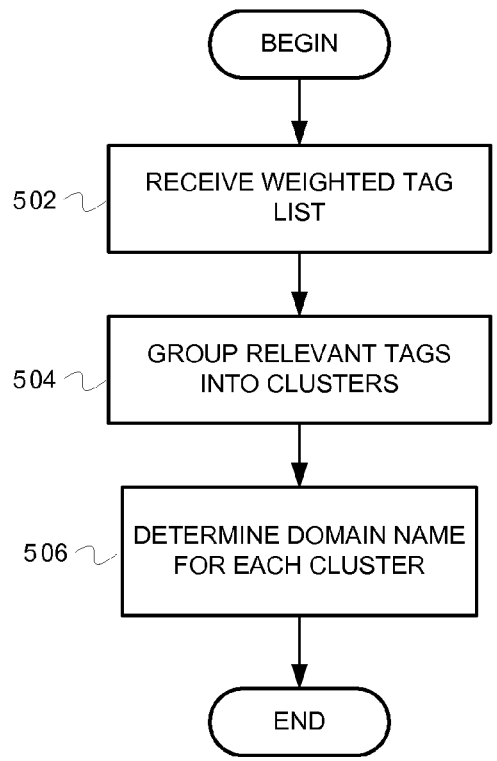
FIG. 5A is a flow diagram illustrating operations for determining a general defining class (domain) for tag words within a linguistic bucket, according to some embodiments of the invention.

FIG. 5A is a flow diagram illustrating operations for determining a general defining class (domain) for tag words within a linguistic bucket, according to some embodiments of the invention. The following discussion will describe the flow 500 with reference to the architectural diagram of FIG. 2. The flow diagram 500 begins at block 502.

At block 502, a semantic domain analyzer 206 receives a weighted tag list 204 from the tag cloud linguistics analyzer 202. The tag cloud linguistics analyzer 202 determines the tag to text ratio, appends this information to each of the tags extracted from the tag cloud, and sends this information to the semantic domain analyzer 206. The semantic domain analyzer 206 groups related tags and determines the domain of the related tags. The domain refers to the largest category or the broadest class, which defines the other tags in the linguistic bucket. The flow continues at block 604.

Figure 5B:
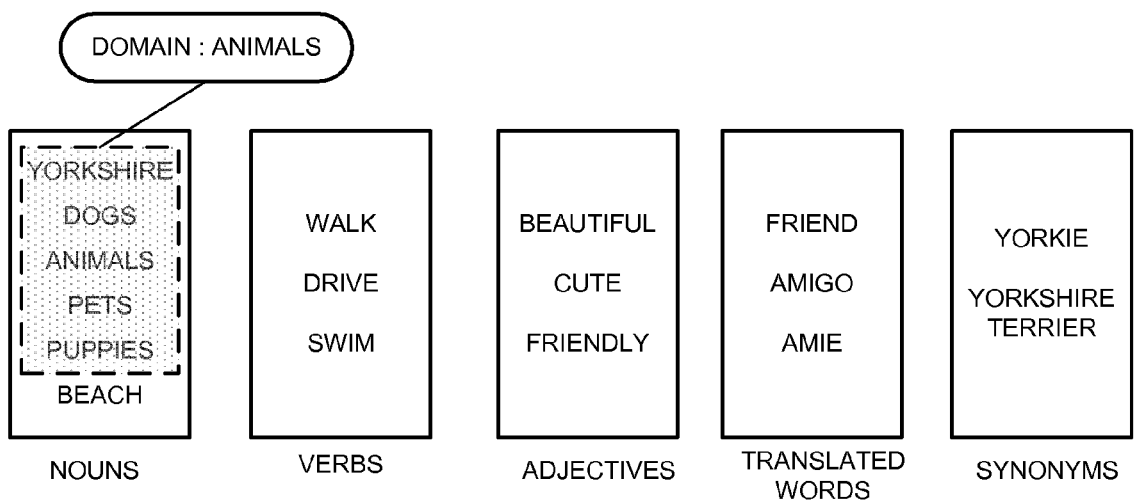
FIG. 5B shows the tag classification and illustrates the noun clusters and noun domain.

At block 504, the semantic domain analyzer 206 uses a thesaurus and clusters the tags in the noun set. The thesaurus can be a visual thesaurus (e.g., Visuwords™) or any suitable dictionary (e.g., an online dictionary, such as Merriam-Webster Online). The semantic domain analyzer 206 can cluster the tags in the noun bucket by semantic affinity. This means that the semantic domain analyzer 206 takes into account common properties of the tags in the noun bucket and determines noun tags that can be used in a similar context. FIG. 5B shows the tag classification and illustrates the noun clusters and noun domain. As shown in FIG. 5B, the nouns Yorkshire, dogs, animals, pets, and puppies are semantically similar. In other words, they have similar word definitions, common properties, and can be used in the same context. Therefore, the semantic domain analyzer groups these words into the same cluster. Referring back to FIG. 5A, the flow continues at block 506.

At block 506, the semantic domain analyzer 206 establishes the domain for each tag cluster. Tags with lower weights are more likely to be super classes and therefore are the best candidates to be the domain name. This is because the more abstract the class is, the fewer users will use it as a tag. For example, people are more likely to tag a picture of a Yorkshire terrier as "YorkshireTerrier" than as "animal". By establishing the domain, the exact meaning of words that are part of the domain can be determined. For example, referring to FIG. 5B, "animals" is the most general noun in the noun set and encompasses all other nouns in the cluster. Hence, the semantic domain analyzer 206 selects "animals" as the domain name. The domain name also helps define the other tags in the linguistic bucket. For example, in FIG. 5B the tag "Yorkshire" may refer to a dog, place in the United Kingdom (U.K.), or a pudding. The domain name helps clarify this ambiguity. If the domain is "animal", Yorkshire refers to a dog while if the domain is "place", Yorkshire refers to a place in the UK, and so on. In FIG. 5A, after the semantic domain analyzer 206 determines the domain name, the flow ends.

A taxonomy builder 208 can further analyze the weighted tags 204 in the linguistic buckets to determine an initial taxonomy, as described below.

Example Taxonomy Builder Operations

Figure 6:
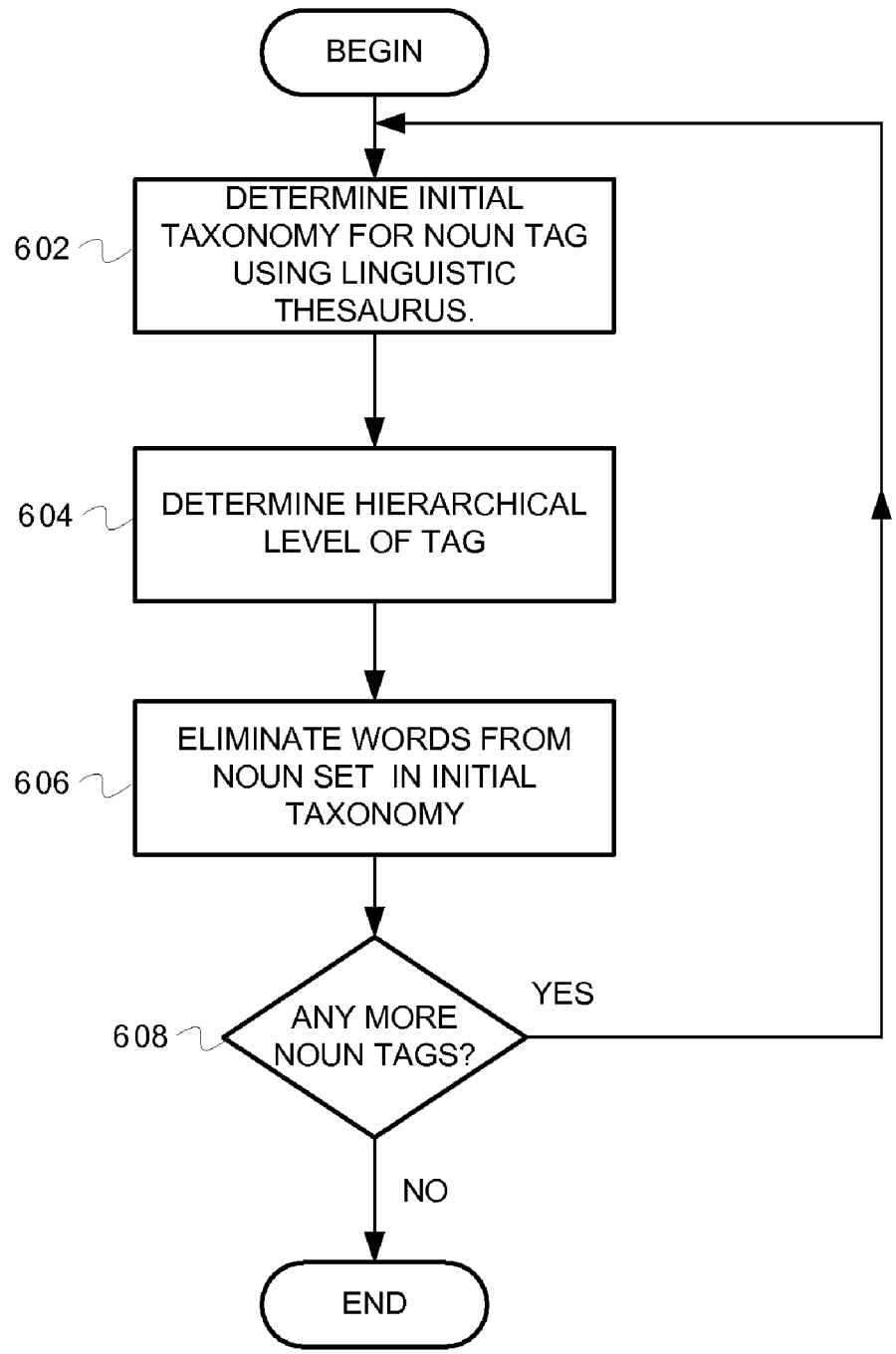
FIG. 6 is a flow diagram illustrating operations for determining taxonomy for noun tags in linguistic buckets according to some embodiments of the invention.

FIG. 6 is a flow diagram illustrating operations for determining taxonomy for noun tags in the linguistic buckets according to some embodiments of the invention. The following discussion will describe the flow 600 with reference to the architectural diagram of FIG. 2. The flow diagram 600 begins at block 602.

Figure 7A:
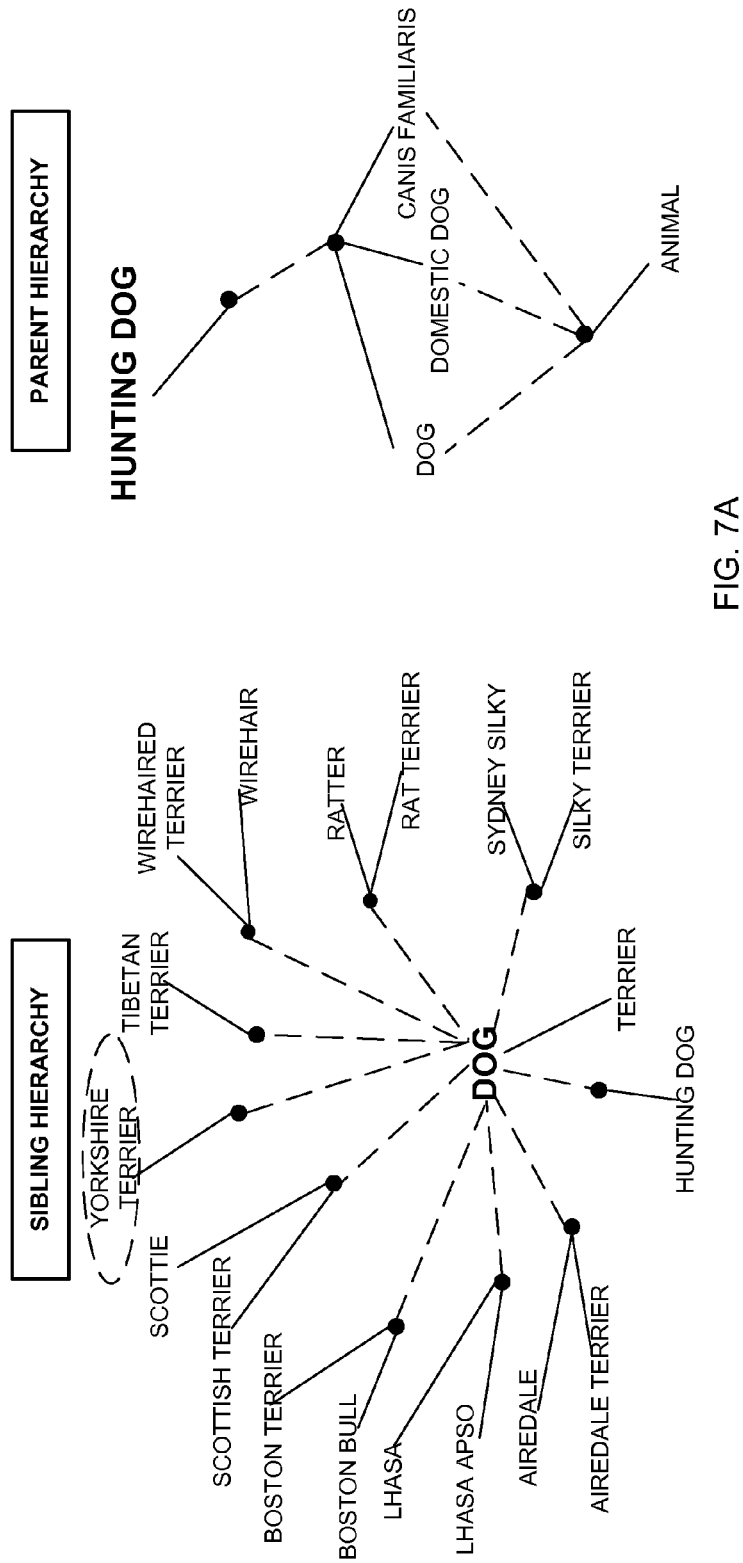
FIG. 7A illustrates an example sibling and parent linguistic hierarchy according to some embodiments of the invention.

At block 602, a taxonomy builder 208 determines an initial taxonomy for the noun tag. Typically, the taxonomy builder 208 starts with the noun tag with the highest weight (tag to text ratio as calculated by the tag cloud linguistic analyzer). The tags with a higher weight are more semantically significant. This implies the higher or more abstract the class, the less it will be used as a tag. Users generally make an effort not to use general words while tagging content so that others can easily find it. In some embodiments, the taxonomy builder 208 interfaces with a linguistic thesaurus to determine data indicating taxonomy for the specified noun tag. Taxonomy is a semantic classification. In other words, it is a group of words that show how the tag relates to other words in a language. FIG. 7A illustrates an example sibling and parent linguistic hierarchy according to some embodiments of the invention. FIG. 7A depicts the taxonomy of a Yorkshire terrier (encircled). Referring back to FIG. 6, the flow continues at block 604.

At block 604, the taxonomy builder 208 determines the hierarchical level of the tag in the initial taxonomy (FIG. 7A). If the taxonomy results from the linguistic thesaurus are graphical, the taxonomy builder 208 can use visual inspection (e.g., optical character recognition (OCR)) to translate the images and determine the hierarchy level. In some instances, the taxonomy results can be in the form of a text or binary data file indicating rank order, class order, and other such relationships between the tag and the other words. If the taxonomy results are in a data file, the taxonomy builder 208 can use data comparison to determine the tag's hierarchical level. Referring to FIG. 7A, the results from the linguistic thesaurus can contain the upper level hierarchy (parent hierarchy) and the sibling hierarchy. In this example, the taxonomy builder 208 sent "Yorkshire terrier" as an input to the linguistic thesaurus. The sibling hierarchy shows that the Yorkshire terrier has many siblings (e.g., Tibetan terrier, Scottish terrier, and other types of terriers). The parent hierarchy shows the general classification of a Yorkshire terrier. For example, the Yorkshire terrier is a part of the "terrier" family, which is a part of the "hunting dog" family, which is a part of the "dog" (also known as domestic dog or *Canis Familiaris*), which finally belongs to the "animal" domain. The process of determining a tag's taxonomy can be an iterative process. For example, on the first pass, the sibling hierarchy may be determined; the second pass may result in a parent hierarchy, the third pass in the parent's parent hierarchy, and so on. In some instances, users may determine the number of iterations that should be carried out to determine the tag's hierarchy. After the taxonomy builder determines the tag's linguistic hierarchy, the flow continues at block 606.

Figure 7B:
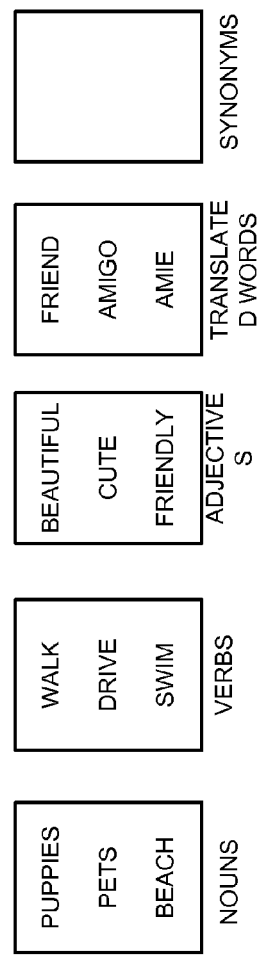
FIG. 7B is an example of a modified linguistic bucket depicting the elimination of tags present in the initial taxonomy according to some embodiments of the invention.

At block 606, the taxonomy builder accesses the linguistic buckets (see FIG. 4B) and eliminates words from the noun set that appear in the initial taxonomy. Doing this ensures that the taxonomy builder does not send (to the linguistic thesaurus) tags whose position in the hierarchy has already been determined. This also ensures that the synonyms, tags with the same root word (derived words), and translated words are not sent to the linguistic thesaurus. In other words, eliminating these words ensures that the taxonomy builder is efficient. In FIG. 4B, the noun tags Yorkshire, dogs, and animals appear in the taxonomy of FIG. 7A. The taxonomy builder eliminates these noun tags (i.e., Yorkshire, dogs, and animals) and their associated synonyms (e.g., Yorkie, Yorkshire terrier) from the linguistic bucket as shown in FIG. 7B. Thus, FIG. 7B is an example of a modified linguistic bucket depicting the elimination of tags present in the initial taxonomy according to some embodiments of the invention. Referring back to FIG. 6, the flow continues at block 608.

Figure 9:
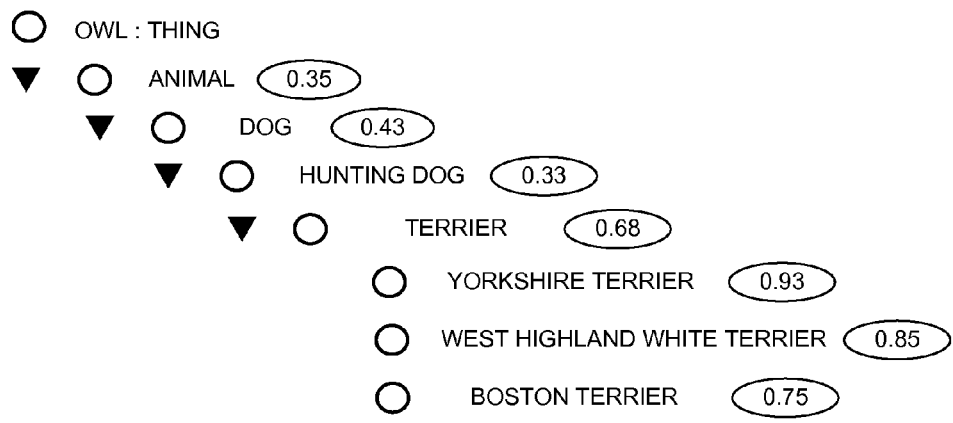
FIG. 9A shows an example of tag statistics and the corresponding weight ratios for each tag.
FIG. 9B illustrates an example of a weighted ontology tree according to some embodiments of the invention.

At block 608, the taxonomy builder determines whether there are any more tags in the noun bucket. The taxonomy builder can use a linguistic thesaurus to determine the sibling and parent hierarchy associated with each of the noun tags in the linguistic bucket. The taxonomy builder can use any suitable algorithm to evaluate each of these hierarchy trees and combine them into a single taxonomy, which relates all the noun tags in the linguistic bucket. FIG. 9B (without the weights) illustrates an example of a consolidated taxonomy tree after the taxonomy builder evaluates and combines the noun tags' individual taxonomy. If the taxonomy builder determines that the noun bucket contains tags, the flow continues at block 602, where the tag with the highest weight is sent to a linguistic thesaurus, its hierarchical level analyzed, its parent hierarchy determined, and related noun tags eliminated from the linguistic buckets. This operation continues until the linguistic noun bucket is empty. If the linguistic noun bucket is empty, the flow ends.

A taxonomy analyzer 212 then determines the statistics of the nodes in the taxonomy to create a weighted taxonomy tree as described below.

Example Taxonomy Analyzer Operations

Figure 8:
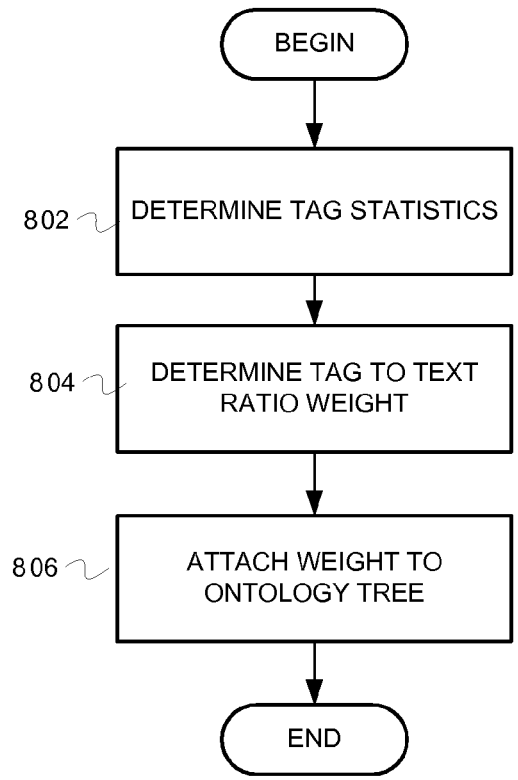
FIG. 8 is a flow diagram illustrating operations for determining statistics of tag occurrences and determining the associated tag weight according to some embodiments of the invention.

FIG. 8 is a flow diagram illustrating operations for determining statistics of tag occurrences and determining the associated tag weight according to some embodiments of the invention. The following discussion will describe the flow 800 with reference to the architectural diagram of FIG. 2. The flow diagram 800 begins at block 802.

At block 802, the taxonomy analyzer 212 determines the statistics of the tag. This means that the taxonomy analyzer determines the number of times the tag word occurs in the text, in the title, and as a tag. To get accurate statistics, the taxonomy analyzer 212 includes the title as an implied tag. This is because people generally treat titles as tags and often do not use nouns in the title as tag words. FIG. 9A shows an example of tag statistics and the corresponding weight ratios for each tag. As shown in FIG. 9A, tag statistics are associated with a tag and its occurrence in text, title, and tags. For example, consider the 'Yorkshire terrier' tag. The numbers corresponding to the title, text and tag columns can be obtained by performing a website specific search for the "Yorkshire terrier" tag. The word "Yorkshire terrier" occurs 15 times in the text including all the pages associated with a specified website. The word "Yorkshire terrier" was used 5 times as a tag and is used to indicate 5 different web-pages within the same website. Similarly, parsing through the titles associated with every web page on the website, 9 occurrences of 'Yorkshire terrier' were found. Referring back to FIG. 8, after the taxonomy analyzer 212 determines the tag's statistics, flow continues at block 804.

At block 804, the taxonomy analyzer 212 determines the tag to text ratio weight. To calculate this weight, the taxonomy analyzer 212 makes use of the statistics of the tag in the text, tags, and title. The title is considered to be an implied tag. The taxonomy analyzer 212 calculates the final weight ratio as (Tag+Title)/Text. The weight ratios associated with the tags are indicative of how understandable or semantically unambiguous the tags are. In FIG. 9A, the last column shows the calculated tag ratio weight. Animal has the lowest weight of 0.35 because it a general word and could include all sorts of animals. On the other hand, 'Yorkshire terrier' is a more specific indication of what the user is describing (or tagging) and hence has a higher weight of 0.93. This means that tags with a higher weight (e.g., Yorkshire terrier) are more meaningful and descriptive (i.e., semantically significant) as compared to tags with a lower weight (e.g., animal). Referring to FIG. 8, the flow continues at block 806.

At block 806, the taxonomy analyzer 212 appends these weights to the ontology tree obtained from the taxonomy builder. As described previously, the taxonomy builder 208 generates taxonomy (tree structure showing how words relate to each other) for each noun tag and creates a cumulative tree structure depicting relationships between all the noun tags. The taxonomy analyzer 212 then calculates a weight for each of the component nouns in the tree structure and appends or associates the weights with the corresponding noun tags. FIG. 9B illustrates an example of a weighted ontology tree according to some embodiments of the invention. The ontology tree starts with the domain (animal) which is the most general classification. Every subsequent level in the ontology tree (dog, hunting dog, and so on) provides more description and is more specific as compared to the previous level. Thus, "terrier" is a sub class of "hunting dog" and is a more specific type of hunting dog. Referring back to FIG. 8, after the taxonomy analyzer 212 attaches the tag to text ratio weight to the ontology tree, the flow ends.

After the taxonomy analyzer 210 stores the weighted ontology in a repository, a relationship analyzer 214 determines the relationship between words in the tag cloud.

Example Relationship Analyzer Operations

Figure 10:
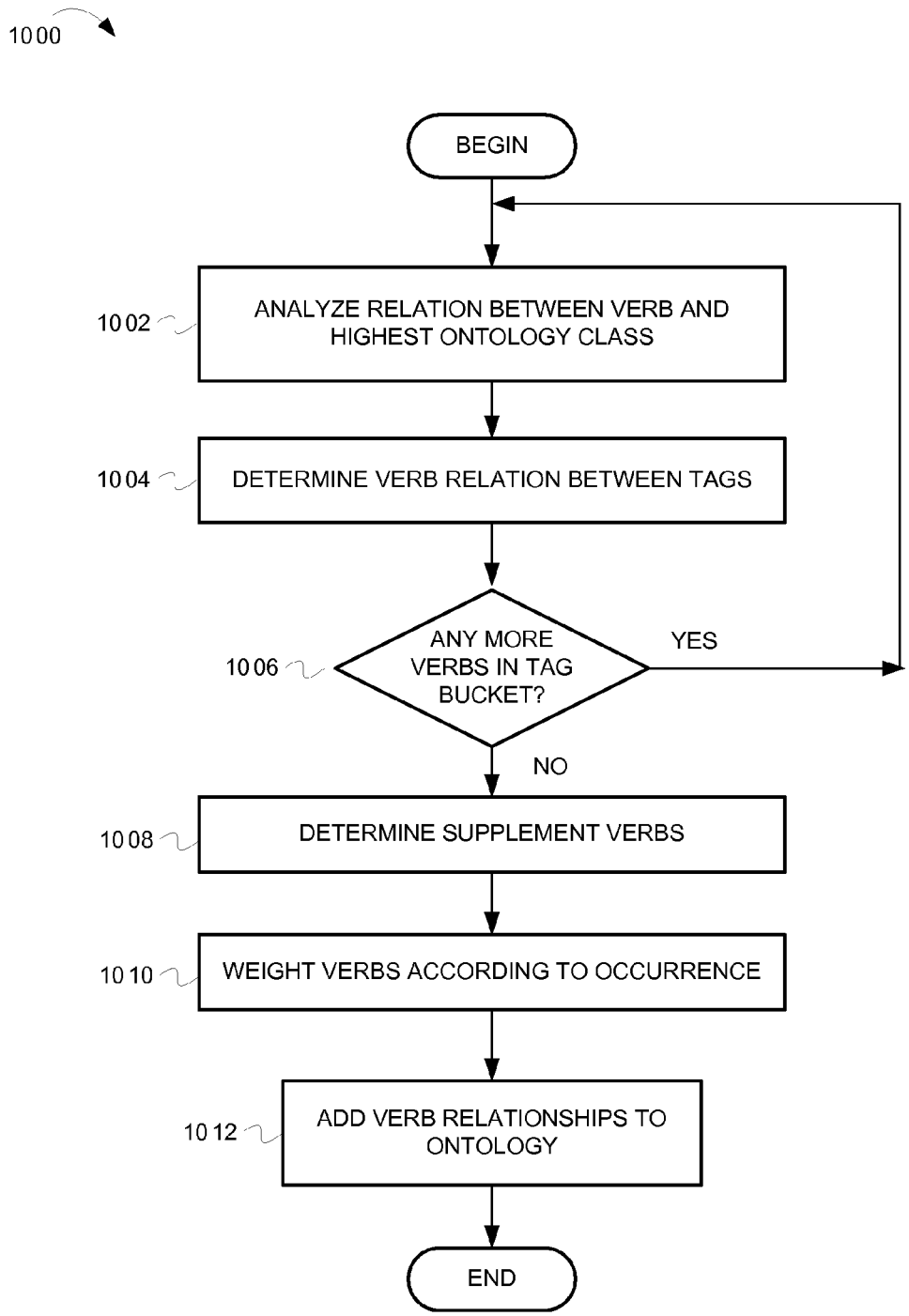
FIG. 10 is a flow diagram illustrating operations for determining implied relationships between tags in a tag cloud according to some embodiments of the invention.

FIG. 10 is a flow diagram illustrating operations for determining implied relationships between tags in a tag cloud according to some embodiments of the invention. These operations describe and classify the relationships between various tags, domains, and ontology classes. The following discussion will describe the flow 1000 with reference to the architectural diagram of FIG. 2. The flow diagram 1000 begins at block 1002.

Figure 11:
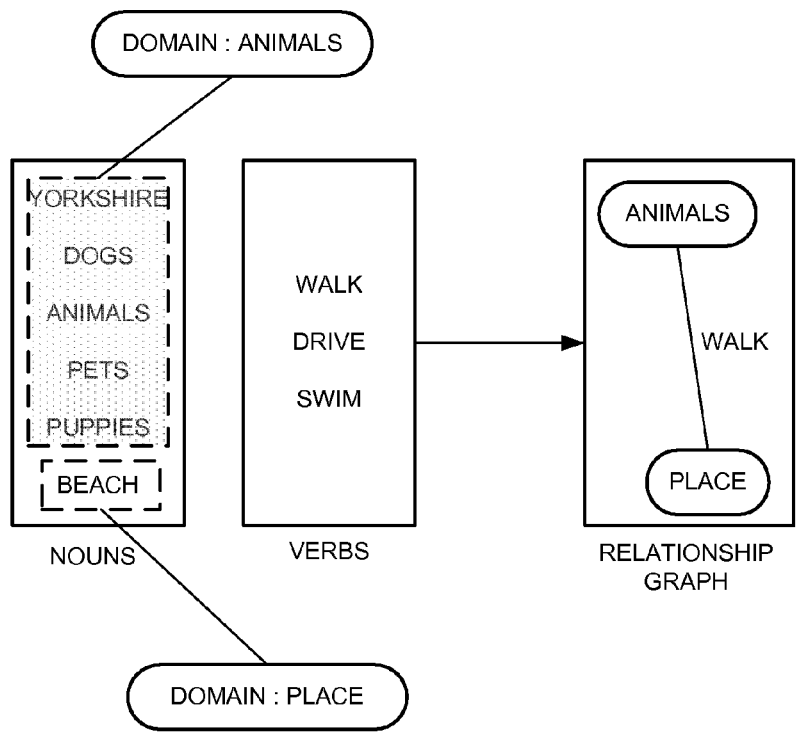
FIG. 11A depicts a statistical analysis of the verbs and the associated domains according to some embodiments of the invention.
FIG. 11B shows a relationship graph illustrating the relationship between domains.

At block 1002, the relationship analyzer 214 analyzes the relationship between a verb in the verb linguistic bucket (shown in FIG. 4B) and the highest ontology class to identify possible relationships. The highest ontology class is the most general class and is typically the domain name. For example, FIG. 11A depicts a statistical analysis of the verbs and the associated domains according to some embodiments of the invention. The relationship analyzer uses any suitable algorithm to parse through the text on the website and determines the verb's occurrence statistics in the text. In FIG. 10, the flow continues at block 1004, where the relationship analyzer 214 determines the relationship between the tags.

At block 1004, the relationship analyzer 214 determines verb relationships between tags. In some instances, the relationship analyzer 214 can interface with a linguistic dictionary to determine the verb's usage with other tags. For example, to identify the relationship between "yorkie", "walk", and "beach", the relationship analyzer 214 can send "walk" to the linguistic dictionary. The linguistic dictionary can return possible usages of the verb "walk" including the fact that "walk" can have a transitive (verbs with a subject and objects) and an intransitive usage (verbs with a subject but no objects). In some instances, the relationship analyzer 214 can use a suitable algorithm to parse through the dictionary results to determine verb relationships. Thus, for the intransitive verb's usage, the relationship analyzer 214 determines that "yorkie walks on the beach". For the transitive verb's usage, the relationship analyzer 214 determines that "people walk yorkies on the beach". FIG. 11B shows a relationship graph illustrating the relationship between domains. FIG. 11B shows how the "animal" domain and the "place" domain are related. After the relationship analyzer 214 determines all the possible usages for the specified verb, the flow continues at block 1006.

At block 1006, the relationship analyzer 214 determines whether there are any more verbs in the verb bucket (refer FIG. 4A). FIG. 11A shows a completed statistical analysis for all the verbs (e.g., walk, swim, drive) in the verb bucket. If the relationship analyzer 214 determines that there are verbs in the verb linguistic list that that have not been analyzed, the flow continues at block 1002 where the relationship analyzer determines the verb statistics and the verb relationship. Otherwise, the flow continues at block 1008.

Figure 12:
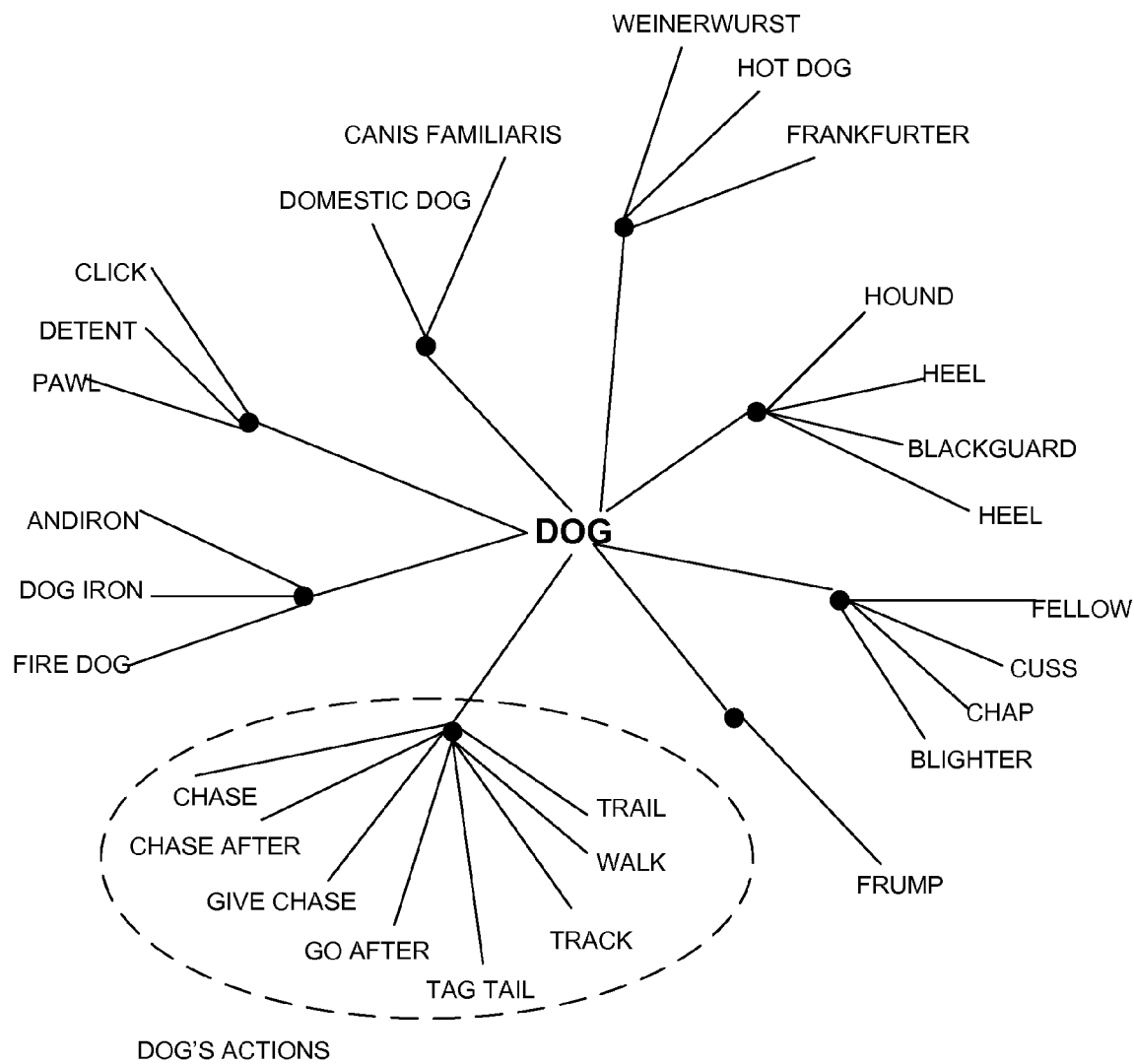
FIG. 12 illustrates the results of a linguistic analysis on a noun tag including the actions performed by the noun.

At block 1008, the relationship analyzer 214 determines supplement verbs identifying the actions performed by the noun tag. Because people generally do not use verbs as tag words, the linguistic verb bucket includes very few verb relationships. To determine other relationships between the noun tags and to create a more exhaustive ontology definition, the relationship analyzer 214 can perform a linguistic analysis on the noun tags. The relationship analyzer can receive information about the noun tags from the linguistic thesaurus and use a suitable algorithm to parse through this information and determine supplement relationship verbs. FIG. 12 illustrates the results of a linguistic analysis on a noun tag including the actions performed by the noun. FIG. 12 shows the results of a linguistic analysis performed on the "dog" tag. The results return various synonyms, colloquialisms, alternate definitions, actions, etc. The relationship analyzer 214 can use the results from the linguistic dictionary, determine the actions performed by a dog (encircled in FIG. 12), and append these supplement relationship verbs to the ontology definition to provide a deeper understanding of the relationships between different domains. After the relationship analyzer 214 determines the various verb relationships, the flow continues at block 1010.

At block 1010, the relationship analyzer 214 weights the verbs according to their occurrence. In some instances, the relationship analyzer 214 can include a ranking algorithm to rank verbs according to their occurrence. For example, verbs that appear in the statistical analysis and in the dictionary are ranked "1", thus denoting that the verbs are valid actions and used most frequently by people (e.g., walk). Verbs that appear only in the statistical analysis (FIG. 11A) are ranked "2". For example "swim" and "drive" appear only in the statistical analysis. This indicates that although these verb tags are popular, these actions are not often associated with members of the animal domain. Finally, verbs that appear only in the dictionary (FIG. 12) (e.g., chase, trail, track, etc) are ranked "3". Thus, the relationship analyzer 214 can use the verb ranks to determine which verbs should be included in the ontology. The flow continues at block 1012.

At block 1012, the relationship analyzer 214 adds the verbs to the ontology. As described previously, the relationship analyzer categorizes the verbs based on their occurrence in statistical analysis and in the dictionary. In some instances, all the verbs from the statistical analysis and the dictionary are included in the ontology. In some embodiments, only the most relevant verbs are added to the ontology definition. For example, verbs that show up in statistical analysis and in the dictionary (rank 1 verb) are valid actions and are popular with the tag users. Hence, these verbs must definitely be a part of the ontology. Thus, the relationship analyzer 214 determines the relationship between ontology classes based on reality usage (i.e., how people use words) and linguistic usage (i.e., how words are defined). After the relationship analyzer 214 appends the specified verbs to the ontology, the flow ends.

Example Attribute Analyzer Operations

Figure 13:
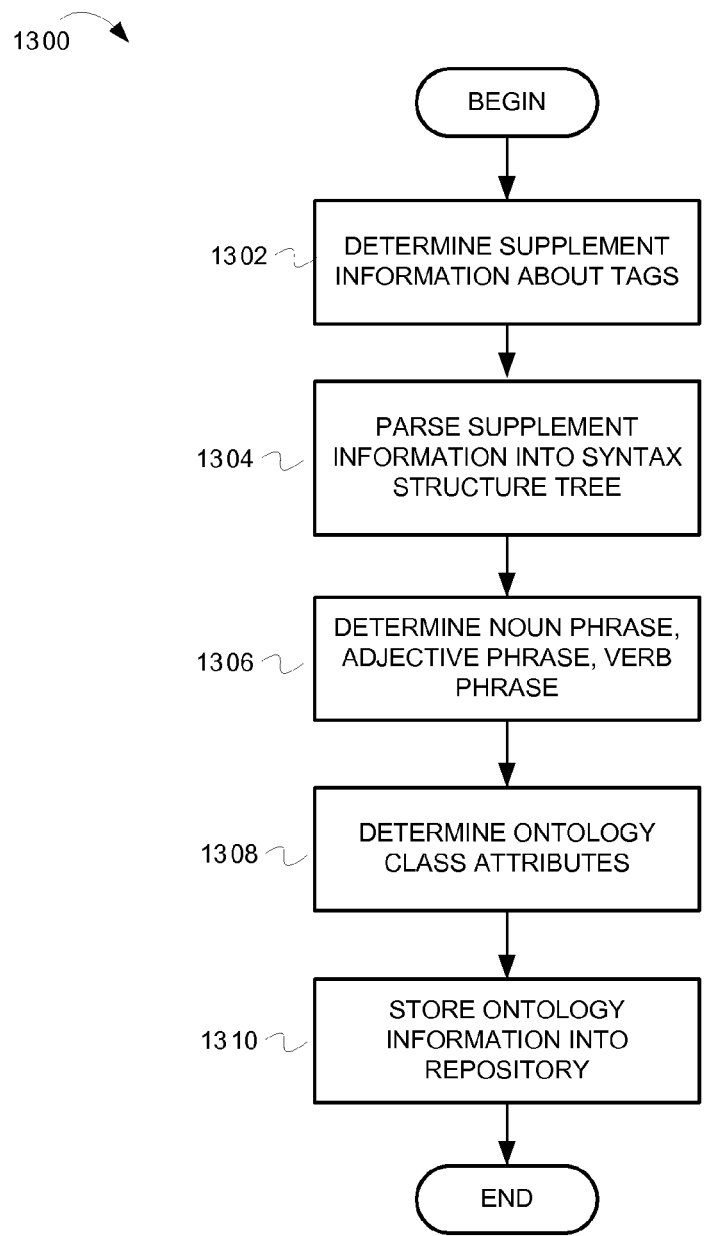
FIG. 13 is a flow diagram illustrating operations for determining and appending attributes for different ontology classes according to some embodiments of the invention.

FIG. 13 is a flow diagram illustrating operations for determining and appending attributes for different ontology classes according to some embodiments of the invention. The following discussion will describe the flow 1300 with reference to the architectural diagram of FIG. 2. The flow diagram 1300 begins at block 1302.

At block 1302, the attribute analyzer 216 determines supplement information about the various ontology classes. In some instances, the attribute analyzer can connect to an online dictionary or use a local dictionary to determine various supplement information associated with the ontology classes. The attribute analyzer can also use any suitable algorithm to parse through the related results. For example, results for a "Yorkshire terrier" may include information such as "a terrier with wiry hair", "small rough coated terrier of British origin", and so on. After the attribute analyzer 216 receives the supplement information related to the nodes (ontology classes), the flow continues at block 1304.

At block 1304, the attribute analyzer 216 parses this supplement information into a syntax structure tree (e.g., Noam Chomsky's tree). A syntax structure tree includes a set of precise rules (grammar) which govern the structure of the language and the creation of sentences. These rules can include classification of words into parts of speech, connecting the parts of speech, etc. A syntax structure tree illustrates a hierarchical relationship between different parts of the sentence. For example, a sentence can include a subject (i.e., noun phrase) and a predicate (i.e., verb phrase). The noun phrase can further include an article (e.g., a, an, the), nouns, prepositional phrases (describing the noun), adjectives, etc. Similarly, the verb phrase can include the verb (i.e., noun's action) and a noun phrase. The syntax structure tree can also account for combined sentences by identifying conjunctions (e.g., and) joining two or more sentences. The attribute analyzer 216 can use these rules, to classify the supplement information into different components and finally determine the attributes for the ontology classes. The flow continues at bock 1306.

At bock 1306, the attribute analyzer 216 compares the supplement information with the syntax structure tree's rules and determines the different components of the sentence. The attribute analyzer can identify noun phrases (e.g., English origin), verb phrases (e.g., resembles a lamb), prepositional phrases (e.g., with a silky blue gray coat), and adjective phrases (e.g., medium sized terrier). After the attribute analyzer 216 determines the supplemental information's different parts of speech, the flow continues at block 1308.

At block 1308, the attribute analyzer 216 determines ontology class attributes. The attribute analyzer can process the different parts of speech (e.g., noun phrase, verb phrase, etc) and extract the attributes for the ontology class. In some instances, the attribute analyzer can parse the sentences' components through another syntax structure tree to determine the attributes. For example, consider the prepositional phrase "with a silky blue gray coat". The attribute analyzer can process this information to determine a preposition (i.e., with), an article (i.e., a), and the ontology class attributes (i.e., silky blue gray coat). After the attribute analyzer 216 determines the ontology class attributes, the flow continues at block 1310.

At block 1310, the attribute analyzer 216 stores this information into an ontology repository 218. The repository supports ontology definition and inferencing capabilities. The ontology data repository can be realized in different schema and implementations (e.g., RDF table). The repository can be on a centralized server or local to a particular machine. This repository contains different domains, their sub classes, attributes, and/or properties defining the various classes, and the relationship between different domains and classes. The information stored in the repository can be used to generate a more user-friendly ontology tree according to the user's preferences (e.g. domain name). After the ontology (domain and sub class) information has been stored in the repository, the flow ends thus converting the initial tag cloud into a well-defined descriptive tag classification.

The process of determining an exhaustive ontology is an iterative process. The sequence of operations described parses through one tag cloud at a time. Once the ontology information for the specified tag cloud is determined and stored in the repository, the system searches for another tag cloud. In some instances, users may also choose to halt the process of ontology generation. In other instances, users may have the option of specifying a tag cloud (e.g., tag cloud URL) or a website, which contains tag clouds. The new tag cloud is sent to the tag cloud linguistics analyzer 202, where the tags are extracted and grouped into linguistic elements. The semantic domain analyzer 204 clusters related nouns and determines the domain of the noun tags in the tag cloud. The system queries the ontology repository 218 (database) to determine if the ontology class (domain) already exists. If the ontology class does not exist, a new one is created following the sequence described in FIG. 2 and the corresponding information is added to the repository. If the ontology class exists, information derived from the new tag cloud is added to the repository. This involves augmenting the existing ontology class, adding more restriction, relationships, and attributes.

Example User Operation for Ontology Tree Generation

Figure 14:
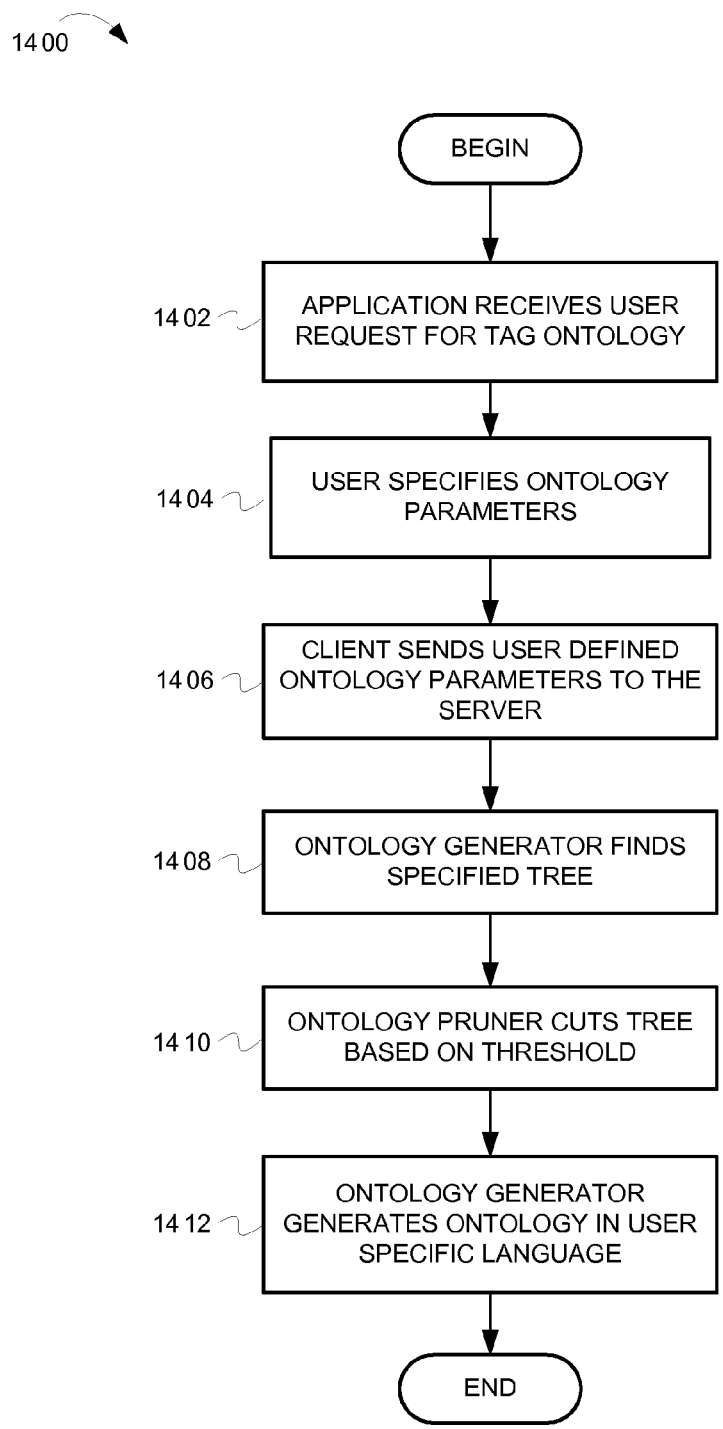
FIG. 14 is a flow diagram illustrating users' operations for pruning and generating an ontology tree according to some embodiments of the invention.

FIG. 14 is a flow diagram illustrating users' operations for pruning and generating an ontology tree according to some embodiments of the invention. The following discussion will describe the flow 1400 with reference to the architectural diagram of FIG. 2. The flow diagram 1400 begins at block 1402.

At block 1402, an application receives a request to display tag ontology. The application could be a web browser or any other software, which supports presenting tag clouds and tag ontology. In some instances, users can request tag ontology by clicking on a link or a graphical user interface (GUI) component (e.g., button) on the application. In some instances, the website may automatically generate an ontology request when a user clicks on a link to a website. The application can open up a GUI in the form of a pop-up window or a sidebar on the web browser. The flow continues at block 1404, where the application prompts the users to enter their preferences (e.g., ontology class).

Figure 15:
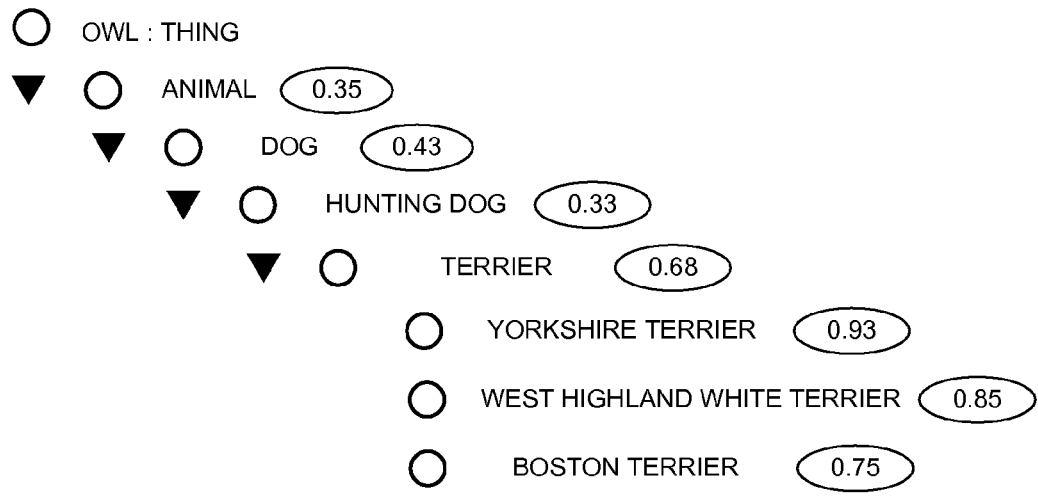
FIG. 15A illustrates an example ontology for a Yorkshire terrier.
FIG. 15B illustrates a pruned ontology according to some embodiments of the invention.
Figure 15:

At block 1404, the client application prompts users to specify ontology parameters including a tagging threshold, ontology class, ontology language, etc. The tagging threshold is important in pruning the ontology and displaying a concise or verbose ontology depending on the user's specifications. FIG. 15A illustrates the ontology for a Yorkshire terrier. Each of the classes and subclasses have weights (in circles) associated with them. In some instances, the user interface (e.g., website GUI) may display an initial ontology with weights to help the user better select a threshold, may let the user enter weights by trial and error, etc. The user can enter a pruning threshold to remove all classes with a weight lower than the threshold. The higher the threshold, the more concise is the ontology. Similarly, the lower the threshold, the more verbose is the displayed ontology. Users can also specify the ontology domain, classes and subclasses by entering it in a textbox, selecting it from a drop down menu, or by other means. In some instances, users may also have the option of including ontology class siblings, attributes, and actions thus making the ontology tree more descriptive. The client application can also prompt the user to enter a desired ontology language (RDF, OWL, etc). An ontology language is a formal programming language used to encode ontology. In FIG. 14, the flow continues at block 1406.

At block 1406, the client application connects to the server to send the user's preference information. The client can send a file (e.g., an XML file) including the user specified ontology class, pruning threshold, ontology language, and other user preferences (e.g., include ontology attributes, etc). The flow continues at block 1410, where the server can locate the appropriate ontology tree, prune it according to the user-defined threshold, and interface with the client's application program to display the ontology.

At block 1408, an ontology generator 222 locates and retrieves the specified ontology classes, sub classes, attributes, and other relationships from the ontology repository. The ontology generator 222 can use the information specified by the user to retrieve relevant data from the ontology schema 218 and construct the ontology. FIG. 15A illustrates the initial ontology for a Yorkshire terrier as generated by the ontology generator. The ontology generator sends the weighted ontology tree to the ontology pruner 220. The flow continues at block 1410.

At block 1410, the ontology pruner 220 uses the user specified tagging threshold to prune the ontology. The ontology pruner 220 can eliminate all the ontology classes with a weight lower than the tagging threshold. The higher the threshold, the more concise is the ontology. Similarly, the lower the threshold, the more descriptive is the displayed ontology. FIG. 15B illustrates a pruned ontology according to some embodiments of the invention. As shown in FIG. 15B, the pruning threshold is 0.35. Therefore, the ontology pruner 220 removes all the ontology classes that have a weight lower than 0.35 (e.g., hunting dog). Referring back to FIG. 14, the flow continues at 1412.

At block 1412, the ontology generator 222 converts the ontology into the user specified ontology language 224. Different ontology languages have different features, machine interpretability, etc (e.g., OWL is a stronger language than RDF). Ontology languages 224 may also have different versions, which may or may not be compatible with each other. Different users may be familiar with different ontology languages and may want to view the ontology in a specific language. The ontology generator 222 can generate the ontology in a suitable user specified language. The ontology generator 222 can interface with the application on the client 104 via the network 114 to display the desired ontology. The flow then comes to an end.

CONCLUSION

While the embodiments are described with reference to various implementations and exploitations, it is understood that these embodiments are illustrative and that the scope of the inventive subject matter is not limited to them. In general, techniques for deriving a linguistic based ontology from tag clouds are described herein and may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned; and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    receiving a tag cloud including a plurality of tags that hyperlink to web content, wherein the tag cloud is chosen by a user and wherein each of the plurality of tags are chosen by users of the web content from among words appearing in the web content;
    separating each of the plurality of tags into linguistic categories;
    assigning a weight to each of the plurality of tags, wherein the weight is based on a number of times the tag is selected by the users of the web content plus a number of times the tag appears as a title in the web content divided by a number of times the tag appears in the web content;
    grouping at least a first subset of the plurality of tags that are associated with a noun linguistic category into tag clusters, wherein each tag in each tag cluster is associated with a common context;
    determining a domain for each of the tag clusters, wherein each domain defines one or more of the tags of the noun linguistic category that belong to the tag cluster;
    for each of the first subset of the plurality of tags that are associated with the noun linguistic category, determining, in accordance with the weights of the tags, a weighted ontology tree for the tags based on results from a visual thesaurus;
    for each of a second subset of the plurality of tags that are associated with a verb linguistic category, identifying linguistic relationships between each tag of the second subset of the plurality of tags and each of the domains; and
    determining properties associated with one or more of the plurality of tags and one or more of the domains, wherein the properties are determined using linguistic analysis.

2. The method of claim 1, wherein the linguistic categories include at least one of verbs, nouns, adjectives, synonyms, derived words, and translated words.

3. The method of claim 1, wherein the determining the properties includes:
    determining supplement information about the one or more tags of the first subset of the plurality of tags that are associated with the noun linguistic category, wherein the supplement information includes data from an online dictionary;
    parsing the supplement information into a syntax structure tree by classifying the supplement information into parts of speech including noun phrases, verb phrases, and adjective phrases; and
    processing the parsed supplemental information to determine one or more attributes associated with the one or more tags of the first subset of the plurality of tags that are associated with the noun linguistic category.

4. The method of claim 1 further comprising:
    receiving a second plurality of tags that hyperlink to second web content;
    determining that one or more of the second plurality of tags are associated with the domain that is part of an existing ontology;
    determining one or more new attributes and relationships associated with the one or more of the second plurality of tags and one or more of the first plurality of tags associated with the domain; and
    augmenting the existing ontology to reflect the second plurality of tags, the new attributes, and the new relationships.

5. The method of claim 1 also comprising:
    storing the plurality of tags, the weighted ontology tree, the linguistic relationships, and the properties in an ontology repository;
    receiving a request to generate a tag ontology, wherein the tag ontology is generated from information in the ontology repository;
    determining relevant information from the ontology repository based on user-defined ontology parameters;
    pruning the tag ontology based on a pruning threshold, wherein the pruning threshold determines a conciseness or verbosity of the tag ontology; and
    presenting the tag ontology, wherein the tag ontology is in the form of a hierarchy tree.

6. The method of claim 5, wherein tag ontology includes a classification of the one or more of the tags, an association of the tags with synonyms, an indication of context for the tags, and definitions of relationships between one or more of the tags.

7. The method of claim 5, wherein user-defined ontology parameters include one or more of pruning threshold, ontology class, ontology sub-class, ontology language, requirement of ontology attributes, ontology relationships, and ontology siblings.

8. The method of claim 5, wherein a third subset of the plurality of tags with a weight lower than the pruning threshold are removed from the tag ontology.

9. The method of claim 5, further comprising:
    dynamically generating the tag ontology in a user-specified ontology language.

10. The method of claim 1, wherein said grouping at least the first subset of the plurality of tags that are associated with the noun linguistic category into tag clusters comprises:
    determining that a first tag of the first subset of the plurality of tags and a second tag of the first subset of the plurality of tags have a common characteristic and are semantically similar; and
    grouping the first tag of the first subset of the plurality of tags and the second tag of the first subset of the plurality of tags into a first cluster.

11. The method of claim 1, wherein said determining the domain name for each of the tag clusters comprises:
    selecting one of the tags in the tag cluster that is associated with the lowest weight; and designating the selected tag with the lowest weight as the domain associated with the tag cluster, wherein the domain describes other of the tags that belong to the tag cluster.

12. The method of claim 1, wherein for each of the first subset of the plurality of tags that are associated with the noun linguistic category, said determining the weighted ontology tree for the subset of the plurality of tags based on the weights of the tags comprises:

ordering the tags of the first subset of the plurality of tags that are associated with the noun linguistic category based on the weight assigned to each of the tags;

for each of the ordered first subset of the plurality of tags, determining a hierarchy associated with the tag based on accessing the visual thesaurus, wherein the hierarchy associated with the tag indicates a semantic classification of the tag;

determining whether the hierarchy associated with the tag comprises another of the plurality of the tags;

if it is determined that the hierarchy associated with the tag comprises another of the plurality of tags, determining not to analyze the identified another of the plurality of the tags; and combining the hierarchies determined for each tag of the first subset of the plurality of tags to yield the weighted ontology tree associated with all tags of the first subset of the plurality of tags that are associated with the noun linguistic category, wherein the weighted ontology tree indicates relationships between each of the first subset of the plurality of tags that are associated with the noun linguistic category.

13. A system comprising:

a tag cloud linguistic analyzer configured to receive a tag cloud including a plurality of tags that hyperlink to web content, wherein the tag cloud is chosen by a user and wherein each of the plurality of tags are chosen by users of the web content from among words appearing in the web content, the tag cloud linguistic analyzer configured to separate each of the plurality of tags into linguistic categories, and to assign a weight to each of the plurality of tags, wherein the weight is based on a number of times the tag is selected by the users of the web content plus a number of times the tag appears as a title in the web content divided by a number of times the tag appears in the web content;

a semantic domain analyzer configured to group at least a first subset of the plurality of tags that are associated with a noun linguistic category into tag clusters, wherein tags in each tag cluster are associated with a common context, and to determine a domain for each of the tag clusters, wherein each domain defines one or more of the tags of the noun linguistic category that belong to the tag cluster;

a taxonomy builder configured to determine, for each of the first subset of the plurality of tags that are associated with the noun linguistic category and in accordance with the weights of the tags, a weighted ontology tree for the subset of the plurality of tags based on results from a visual thesaurus;

a relationship analyzer configured to identify, for each of a second subset of the plurality of tags that are associated with a verb linguistic category, linguistic relationships between each tag of the second subset of the plurality of tags and each of the domains;

an attribute analyzer configured to determine properties associated with one or more of the plurality of tags and one or more of the domains, wherein the properties are determined using linguistic analysis;

an ontology repository to store the tags, the hierarchies, the linguistic relationships, and the properties; and a processor configured to execute one or more of the tag cloud linguistic analyzer, the semantic domain analyzer, the taxonomy builder, the relationship analyzer, the attribute analyzer, and the ontology repository.

14. The system of claim 13, wherein the different linguistic categories include at least one of verbs, nouns, adjectives, synonyms, derived words, and translated words.

15. The system of claim 13, wherein the attribute analyzer is further configured to determine supplement information about the one or more tags of the first subset of the plurality of tags that are associated with the noun linguistic category, wherein the supplement information includes data from an online dictionary, to parse the supplement information into a syntax structure tree by classifying the supplement information into parts of speech including noun phrases, verb phrases, and adjective phrases, and processing the parsed supplemental information to determine one or more attributes associated with the one or more tags of the first subset of the plurality of tags that are associated with the noun linguistic category.

16. The system of claim 13, wherein the system is further configured to receive a second plurality of tags that hyperlink to second web content;

determine that one or more of the second plurality of tags are associated with the domain that is part of an existing ontology;

determine one or more new attributes and relationships associated with the one or more of the second plurality of tags and one or more of the first plurality of tags associated with the domain; and augment the existing ontology to reflect the second plurality of tags, the new attributes, and the new relationships.

17. The system of claim 13 also comprising:

one or more applications configured to receive a request to generate a tag ontology, wherein the tag ontology is generated from information stored in an ontology repository;

an ontology generator configured to determine relevant information from the ontology repository based on user-defined ontology parameters and to present the tag ontology, wherein the tag ontology is in the form of a hierarchy tree, and an ontology pruner configured to prune the tag ontology based on a pruning threshold, wherein the pruning threshold determines a conciseness or verbosity of the tag ontology.

18. The system of claim 17, wherein tag ontology includes a classification of the one or more of the tags, an association of the tags with synonyms, an indication of context for the tags, and definitions of relationships between one or more of the tags.

19. The system of claim 17, wherein user-defined ontology parameters include one or more of pruning threshold, ontology class, ontology sub-class, ontology language, requirement of ontology attributes, ontology relationships, and ontology siblings.

20. The system of claim 17, wherein the ontology pruner is configured to remove, from the tag ontology, a third subset of the plurality of tags with a weight lower than the pruning threshold.

21. The system of claim 17, wherein the ontology generator configured to dynamically generate in a user-specified ontology language including OWL and RDF, wherein an ontology language is used to encode ontology.

22. One or more machine-readable storage devices having stored therein a program product, which when executed by a set of one or more processor units causes the set of one or more processor units to perform operations comprising:
- receiving a tag cloud including a plurality of tags that hyperlink to web content, wherein the tag cloud is chosen by a user and wherein each of the plurality of tags are chosen by users of the web content from among words appearing in the web content;
- separating each of the plurality of tags into linguistic categories;
- assigning a weight to each of the plurality of tags, wherein the weight is based on a number of times the tag is selected by the users of the web content plus a number of times the tag appears as a title in the web content divided by a number of times the tag appears in the web content;
- grouping at least a first subset of the plurality of tags that are associated with a noun linguistic category into tag clusters, wherein each tag in each tag cluster is associated with a common context;
- determining a domain for each of the tag clusters, wherein each domain defines one or more of the tags of the noun linguistic category that belong to the tag cluster;
- for each of the first subset of the plurality of tags that are associated with the noun linguistic category, determining, in accordance with the weights of the tags, a weighted ontology tree for the first subset of the plurality of tags based on results from a visual thesaurus;
- for each of a second subset of the plurality of tags that are associated with a verb linguistic category, identifying linguistic relationships between each tag of the second subset of the plurality of tags and each of the domains; and
- determining properties associated with one or more of the plurality of tags and one or more of the domains, wherein the properties are determined using linguistic analysis.

23. The one or more machine readable storage devices of claim 22, wherein the different linguistic categories include at least one of verbs, nouns, adjectives, synonyms, derived words, and translated words.

24. The one or more machine readable storage devices of claim 22, wherein the determining the properties includes:
- determining supplement information about the one or more tags of the first subset of the plurality of tags that are associated with the noun linguistic category, wherein the supplement information includes data from an online dictionary;
- parsing the supplement information into a syntax structure tree by classifying the supplement information into parts of speech including noun phrases, verb phrases, and adjective phrases; and
- processing the parsed supplemental information to determine one or more attributes associated with the one or more tags of the first subset of the plurality of tags that are associated with the noun linguistic category.

25. The one or more machine readable storage devices of claim 22, further comprising:
- receiving a second plurality of tags that hyperlink to second web content;
- determining that one or more of the second plurality of tags are associated with the domain that is part of an existing ontology;
- determining one or more new attributes and relationships associated with the one or more of the second plurality of tags and one or more of the first plurality of tags associated with the domain; and
- augmenting the existing ontology to reflect the second plurality of tags, the new attributes, and the new relationships.

* * * * *